United States Patent [19]

Wood

[11] 4,051,426

[45] Sept. 27, 1977

[54] SHOOT THROUGH PROTECTED CURRENT DRIVEN TRANSISTOR INVERTER CIRCUIT

[75] Inventor: Peter Wood, Murrysville, Pa.

[73] Assignee: White-Westinghouse Corporation, Cleveland, Ohio

[21] Appl. No.: 621,034

[22] Filed: Oct. 9, 1975

Related U.S. Application Data

[63] Continuation of Ser. No. 475,234, May 31, 1974, abandoned.

[51] Int. Cl.$^2$ ............................................. H02M 7/537
[52] U.S. Cl. ................................. 363/131; 310/317
[58] Field of Search .............. 321/2, 11, 12, 18, 45 R; 307/270, 300; 310/8.1; 219/10.77; 331/113 A

[56] References Cited

U.S. PATENT DOCUMENTS

| | | | |
|---|---|---|---|
| 3,467,852 | 9/1969 | Murray et al. | 321/45 R |
| 3,629,725 | 12/1971 | Chun | 321/45 R |
| 3,681,626 | 11/1971 | Puskas | 310/8.1 |
| 3,757,144 | 9/1973 | Hettersheid et al. | 307/300 |
| 3,777,248 | 12/1973 | Vermolen | 321/2 |
| 3,806,688 | 4/1974 | MacKenzie et al. | 219/10.77 |

*Primary Examiner*—William A. Beha, Jr.
*Attorney, Agent, or Firm*—McNenny, Pearne, Gordon, Gail, Dickinson & Schiller

[57] ABSTRACT

An inverter circuit using transistors in the switch mode, suitable for induction heating for cooking and sonar applications. Diodes are used in the base circuit of the transistors to postpone conduction and prevent shoot-through, and diodes are used to limit diode recovery time closely to recovery time of transistor base while protecting against base-emitter avalanching.

4 Claims, 4 Drawing Figures

4,051,426

SHOOT THROUGH PROTECTED CURRENT DRIVEN TRANSISTOR INVERTER CIRCUIT

CROSS REFERENCES

This is a continuation of application Ser. No. 475,234, filed May 31, 1974, now abandoned.

BACKGROUND OF THE INVENTION

The invention relates to inverter circuits in general, and more particularly to inverters using transistors for power conversion.

A background teaching of transistor characteristics in power conversion as compared to controlled rectifiers can be found on pages 32, 33 of a book entitled "Principles of Inverter Circuits" by B. D. Bedford and R. G. Hoft published in 1964 by John Wiley and Sons. The capability to turn-on power, to turn-off power and the switching speed have been stressed in this book as the major differences existing between these two types of switching devices. While it is desirable, when using a power transistor in the switching mode, to avoid the linear region in order to reduce power dissipation in the transistor, the base current is required to flow during the entire period of conduction and at a level sufficient to maintain saturation. In theory, the base is driven by current which is zero at the instant of cut-off, and which is restored to the base at the proper level when the transistor should become saturated again. In practice, transistors are used in pairs, one for each polarity of the DC power supply, and the base current is supplied from an AC current source having the frequency of the desired AC load. A known type of transistor switch inverter can be found on pages 48, 49 of the aforementioned book of Bedford and Haft.

Commutation is a well recognized problem in inverter circuits. Special commutation circuitry has been designed in order to reduce the current to zero at the moment of cutting off and to postpone impressing again the forward voltage until the switch has completely recovered, otherwise there would be a return to conduction at an inappropriate time. However, such circuitry has inherent limitations to increased switching speed and power output.

It is an object of the present invention to provide an improved inverter circuit of the type using transistors as the power switches.

Another object of the present invention is to obtain an inverter circuit using power transistors which are free from shoot-through between the terminals of the DC power supply.

A further object of the present invention is to provide an inverter circuit of the transistor switch type having an improved capability of generating highfrequency and high power output.

SUMMARY OF THE INVENTION

In an inverter circuit using transistors as the power switches, the transistors are driven by a base current through a transformer alternately switching the transistors into conduction and out of conduction. Diodes are inserted in circuit to pass the base current from the transformer and they are so selected that they have a recovery time which is longer than the recovery time of the associated transistor, so that initiation of conduction of the other transistor is retarded by the difference of recovery times with regard to the conducting transistor. Other diodes are inserted in circuit in order to accelerate recovery of the first diodes after full recovery of the last conducting transistor.

DESCRIPTION OF THE INVENTION

Figure 1:
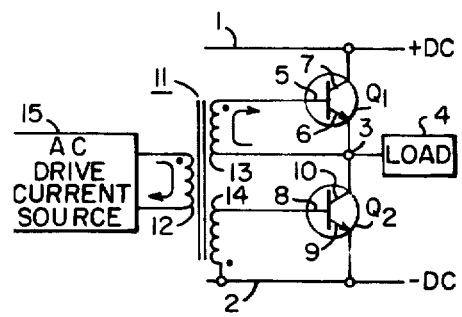
FIG. 1 shows a transistor inverter circuit known in the prior art.

Referring to FIG. 1, two transistors $Q_1$ and $Q_2$ are shown connected between the positive terminal 1 and the negative terminal 2 of a DC power source, the common junction point 3 being connected to a load 4. Transistor $Q_1$ has a base electrode 5, an emitter electrode 6 and a collector electrode 7. Similarly, transistor $Q_2$ has a base electrode 8, an emitter electrode 9 and a collector electrode 10. Transistors $Q_1$ and $Q_2$ are driven in the switching mode e.g. between a saturated state when ON and the bottom state when OFF. Control of conduction is provided by a transformer 11 having a primary winding 12, and two secondary windings 13, 14 which are respectively connected to bases 5 and 8 of transistors $Q_1$ and $Q_2$. Transistors $Q_1$ and $Q_2$ are illustratively shown of the NPN type so that the base-emitter path is used for driving each transistor to conduction between the collector and emitter electrodes thereof. Accordingly, the secondary windings 13, 14 are connected between the base electrode 5, or 8, and the emitter electrode, 6 or 9, of the respective transistors. The primary winding is energized by an AC source 15, and during the current cycle alternately one winding, 13 or 14, is driving the corresponding transistor $Q_1$ or $Q_2$, into conduction. When transistor $Q_1$ is ON, energy is supplied to the load 4 from the positive terminal 1. When transistor $Q_2$ is ON, energy from the load 4 is returned to the negative terminal 2. As a result, DC energy is converted into AC energy available in the load.

This inverter circuit is not fully satisfactory because one transistor might not be completely OFF when the other goes into conduction, so that "shoot-through" between the DC terminals 1 and 2 is likely to occur. This is especially true when the transistors operate in the switching mode since in such instance, the drive current is constantly applied to the base of the transistor during conduction while the transistor is maintained at saturation during most of the conduction state.

Assuming that transistor $Q_1$ is ON and transistor $Q_2$ is OFF, current is being supplied to the primary winding 12 in the direction shown by the arrow on FIG. 1. When the current in the primary winding 12 is reversed, the base current which applied to transistor $Q_1$ by secondary winding 13 in the direction shown on FIG. 1 will tend to reverse itself in an action favorable to sweeping out of the charges which have been stored in the base region during conduction. However, this action lasts after the current reversal, e.g. when the second half of the cycle in the transformer already applies current to the base of transistor $Q_2$, thus driving the latter forcibly into conduction. The two transistors being conducting at the same time, even temporarily, a short-circuit is established between terminals 1 and 2 of the DC power source. This situation is known as a shoot-through.

Shoot-through is to be avoided absolutely because it affects directly the efficiency of power conversion, causes losses in the transistors and it may destroy the switching devices. The risk of a shoot-through is increased when the transistors are used in the switching mode and a high power as well as a high frequency are demanded from the inverter circuit.

Figure 2:
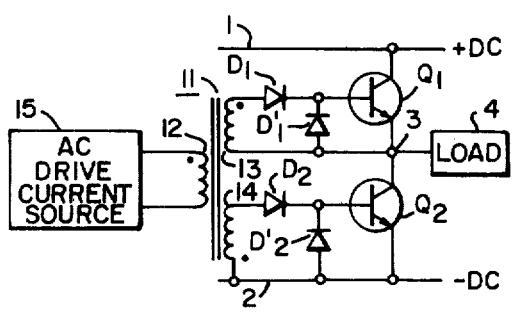
FIG. 2 shows the improved transistor inverter circuit according to the present invention.

FIG. 2 shows illustratively an inverter circuit according to the present invention. The circuit of FIG. 2 differs from the circuit of FIG. 1 by the presence of diodes $D_1$, $D'_1$ and $D_2$, $D'_2$ inserted in circuit with the secondary winding, 13 or 14, and the base electrode 5 or 8, or the respective transistors $Q_1$ and $Q_2$. Diode $D_1$ is so connected that during conduction of transistor $Q_1$, current in winding 13 in the direction shown by the arrow, is allowed to drive the base 5 of the transistor. In the same manner, diode $D_2$ passes the drive current to the base 8 of transistor $Q_2$ when the latter is conducting. Ignoring for the moment that diodes $D'_1$ and $D'_2$ are also connected in circuit, the role of diodes $D_1$ and $D_2$ will be explained first, assuming transistor $Q_1$ is in the conducting state. When the current in the primary winding 12 reverses itself, current still flows in the base-emitter circuit of transistor $Q_1$ but in the reverse direction, due to the stored charges in the base of the transistor and also the stored charge in the diode $D_1$. As a result, the transformer effect existing between windings 12 and 13 actually lasts when it should have subsided to allow only coupling of power between windings 12 and 14 to take place thus prompting a take over by transistor $Q_2$. However, it appears that, at that time, diode $D_1$ is introducing a voltage drop in the circuit of winding 13. As a result a corresponding bias is reflected into the circuit of winding 14 with the result that as long as diode $D_1$ is conducting during the first portion of the rising current in primary winding 12, the secondary winding will be unable to overcome the threshold of diode $D_2$ associated with transistor $Q_2$. In other words, while diode $D_1$ is conducting, transistor $Q_2$ is not driven to conduction. In this fashion, diode $D_1$, prevents the other transistor $Q_2$ from going to conduction as long as diode $D_1$ has not recovered. Diode $D_1$ is so selected that its time recovery is longer than the time recovery of the associated transistor $Q_1$. Thus, it is insured that transistor $Q_2$ will not conduct until after a full recovery of transistor $Q_1$, e.g. when transistor $Q_1$ has become non-conductive, that is when it is safe to allow transistor $Q_2$ to conduct. Diode $D_2$ has the same recovery time characteristic relative to the recovery time of transistor $Q_2$ so that conduction of transistor $Q_1$ before transistor $Q_2$ is prevented until the former has fully recovered.

Figure 3:
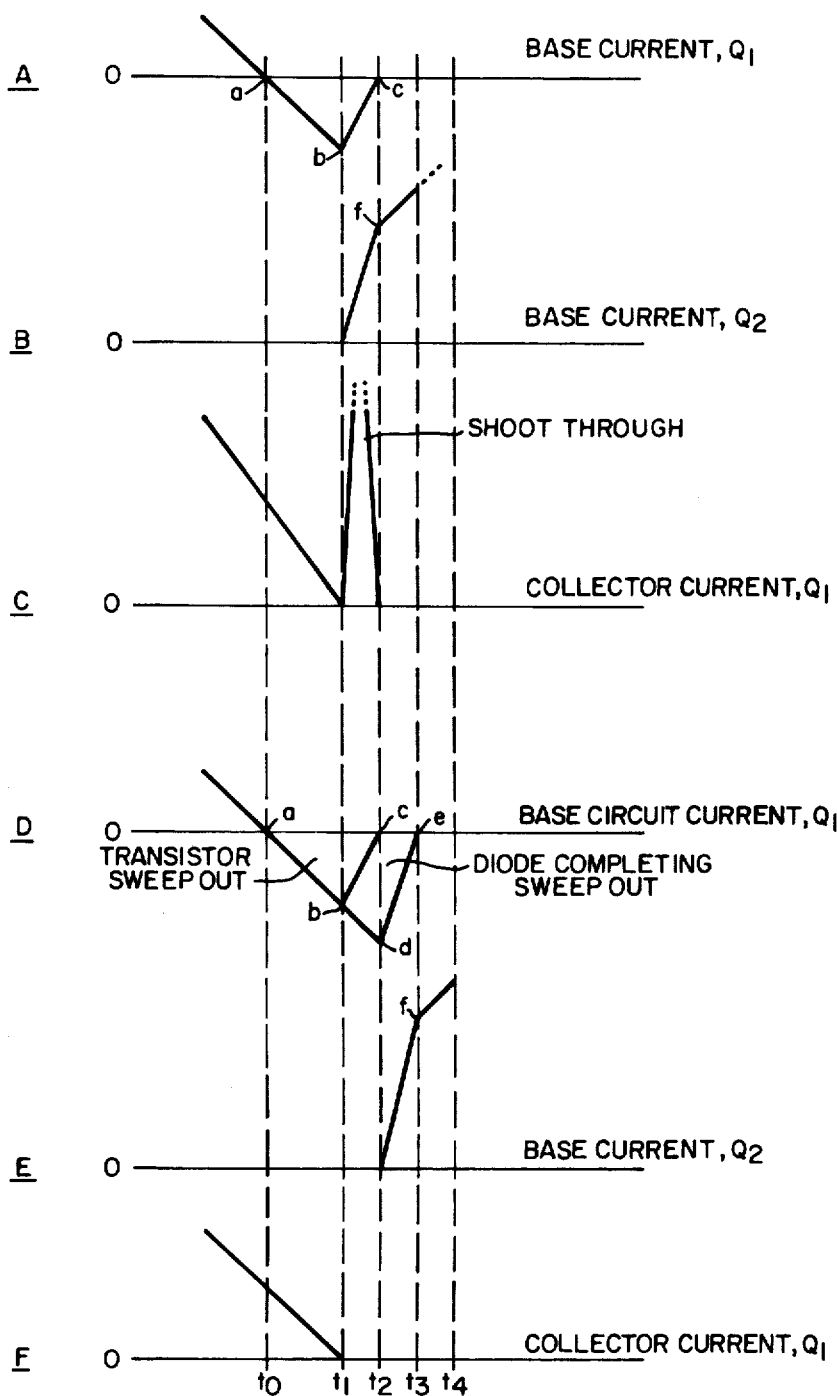
FIG. 3 provides curves characteristic of the base and collector currents of the transistors of FIGS. 1 and 2 by comparison.

The role of diodes $D_1$, $D_2$ will appear more clearly from a consideration of curves A through F of FIG. 3. These curves provide a comparison between the base currents of transistors $Q_1$, $Q_2$ and the collector current of the particular transistor exposed to a risk of a shoot-through at the moment of commutation. Curves A, B and C correspond to a circuit not provided with diodes such as $D_1$, $D_2$. The base current of conducting transistor $Q_1$ passes zero at "a" or time $t_o$ when the driving current in winding 13 changes direction. From $a$ to $b$ on curve A (time $t_o$ to time $t_1$) the base-emitter of transistor $Q_1$ is restricing reverse current flow. However, at time $t_1$ winding 14 is applying on the base electrode of transistor $Q_2$ the base current and curve B indicates forced conduction of transistor $Q_2$. Simultaneous states of conduction of transistors $Q_1$, $Q_2$ causes a shoot-through between times $t_1$ and $t_2$ as shown by curve c. In contrast, referring to FIG. 2, due to the presence of diodes $D_1$, $D_2$ conduction of transistor $Q_2$ is delayed until time $t_2$ as illustrated by curve E. At time $t_1$ recovery of transistor $Q_1$ from $b$ to $c$ on curve D is coupled with conduction of diode $D_1$ from $b$ to $d$ which completes the sweep out for the entire portion $bc$ of curve D, thus preventing during the same period $t_1t_2$ conduction of transistor $Q_2$. Thus, when collector current $Q_1$ at time $t_1$ reaches zero, there is no concomitant conduction with the second transistor $Q_2$, and no shoot-through can occur. This is clear from the gap in time between instant $t_1$ for curve F and instant $t_2$ for curve E.

Ideally, it should be enough that the time recovery of diodes $D_1$ and $D_2$ coincide with the time recovery of transistors $Q_1$ and $Q_2$. However, no such precise characteristics can be achieved in practice. Therefore, it is safer to select a time recovery of diodes $D_1$ and $D_2$ which is larger than the time recovery of the associated transistor. Still, the excess of time so allowed for the recovery of the charge stored in the diode $D_1$ or $D_2$, is limiting the initiation of conduction by the other transistor $Q_2$ or $Q_1$, and such delay would be detrimental both with respect to efficiency of power conversion, and switch speed for high frequency applications of the inverter circuit. In order to solve this problem, diodes $D'_1$ and $D'_2$ have been added in the circuit and connected as shown on FIG. 2. If we assume that diode $D_1$ is still conducting after the recovery of the transistor $Q_1$, current flows via diodes $D_1$ and $D'_1$ across the secondary winding 13. As a result of such current circulation, diode $D'_1$ is in fact sweeping out of the remnant of the charge stored in diode $D_1$, which therefore will recover earlier. The same can be said of diode $D'_2$ when diode $D_2$ is recovering after transistor $Q_2$ has cut-off.

The utilization of diodes such as $D_1$, $D_2$ and $D'_1$; $D'_2$ has proved, in practice, that an improved commutation is obtained which is substantially free from shoot-through between the transistors, while allowing more power as well as a higher frequency of conversion. It is typical of the inverter circuit accoring to the present invention that diodes $D_1$ and $D_2$ become the factors determining the instant at which application of forward base drive to transistors $Q_1$, $Q_2$ begins, and a period of "drive blanking" occurs which is equal to the difference in sweep-out times between the diodes, $D_1$ or $D_2$, and the associated transistor $Q_1$ or $Q_2$. On the other hand, diodes $D'_1$ and $D'_2$ reduce the period of drive blanking to a minimum while insuring that the above difference in sweep-out times will never be negative. A corollary benefit of the provision of diodes such as $D'_1$, $D'_2$ resides in that no special switching properties are required when selecting these diodes, and in that these particular diodes protect the transistors $Q_1$ and $Q_2$ from base-emitter avalanching, which is one of the risks run with fast switching inverter circuits. The preferred application of the present invention is in the art of induction heat cooking utilizing an apparatus such as disclosed in U.S. Pat. No. 3,806,688 entitled "Induction Heat Cooking Apparatus" and assigned to the assignee of the present invention.

Figure 4:
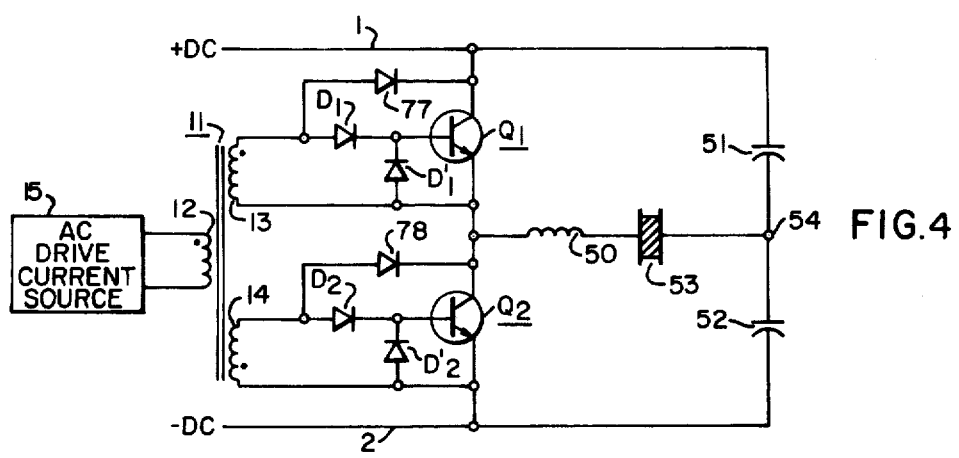
FIG. 4 shows a sonar wave generator using the inverter circuit of FIG. 2.

FIG. 4 is illustrative of the use of the inverter circuit of FIG. 2 for sonar applications. The load consists here in a ballast inductor 50 coupled for resonance with two capacitors 51, 52 mounted between the DC terminals which are alternately switched in circuit with the load by the transistors $Q_1$, $Q_2$. A transducer 53 adapted to convert electric energy into acoustic energy is energized by the resonant circuit between the ballast inductor 50 and the junction 54 common to capacitors 51, 52. Here again, the power of the transistors and the high frequency of commutation are essential factors. The inverter circuit according to the present invention leads to an improved sonar apparatus for the reasons given herein.

I claim as my invention:

1. An inverter circuit operative with a direct current power source having a pair of terminals of opposite polarities and with an alternating current load comprising:

first and second transistor switching means each having a base electrode, an emitter electrode and a collector electrode, said emitter electrode of said first transistor switching means being electrically connected to said collector electrode of said second transistor switching means and to said load, said collector electrode of said switching means being electrically connected to one of said terminals, said emitter electrode of said second switching means being electrically connected to the other of said terminals;

transformer means having at least two secondary windings each for applying alternating current to one of said base electrode one of said secondary windings being electrically connected to said base electrode of said first transistor switching means, the other of said secondary windings being electrically connected to said base electrode of said second transistor switching means, first diode means electrically connected in series relationship between one of said secondary windings and one of said base electrodes and second diode means electrically connected in series relationship between the other of said secondary windings and the other of said base electrodes, one of said first and second diode means being in a conducting condition when the other of said first and second diode means is in a non-conducting condition, said first and second diode means conducting reverse current after said first and second transistor switching means are in a non-conducting condition, another diode means for supplying reverse current to said first and second diode means, said another diode means being in a non-conducting condition when said first and second diode means are in a non-conducting condition.

2. An inverter circuit according to claim 1 wherein said alternating current applied to one of said base electrodes is 180 electrical degrees out of phase with said alternating current applied to the other of said base electrodes.

3. An inverter circuit according to claim 1 wherein said another diode means for supplying reverse current to said first and second diode means includes a third diode connected between said base electrode and said emitter electrode of said first transistor switching means, and a fourth diode connected between said base electrode and said emitter electrode of said second transistor switching means.

4. In an inverter circuit operative with a DC power source having terminals of opposite polarities and with an AC load, including first and second transistor switching means having respective base, emitter and collector electrodes, said switching means being connected in series collectively between said terminals and individually to said load, the combination of:

transformer means having one primary and two secondary windings supplied with AC current for alternately driving with base current said base electrodes to cause alternate conduction of said first and second switching means;

first and second diode means respectively connected in circuit between each secondary winding and its associated base electrode, with one of said first and second diode means allowing base current to pass when the associated one of said first and second switching means is conductive and the other of said first and second diode means is non-conducting, said other of said first and second diode means remaining non-conducting until said one of said first and second transistor switching means has fully recovered following a reversal of said AC current, said first and second diode means having a longer recovery time than the associated one of said transistor switching means;

third and fourth diode means associated with said first and second diode means, respectively, said first and second diode means being each connected between one end of the corresponding secondary winding and the associated base electrode, with said third and fourth diode means being each connected between the other end of the corresponding secondary winding and the associated base electrode, said first and third diode means and said second and fourth diode means having like polarities connected to said associated base electrode, said third and fourth diode means being in a non-conducting condition when said first and second diode means, respectively, are in a non-conducting condition.

* * * * *